United States Patent
Deivasigamani et al.

(10) Patent No.: US 8,885,517 B2
(45) Date of Patent: Nov. 11, 2014

(54) OPERATIONAL STATE MISMATCH IDENTIFICATION FOR A MOBILE DEVICE

(76) Inventors: Giri Prassad Deivasigamani, San Jose, CA (US); Gaurav Nukala, Sunnyvale, CA (US); Muhammad A. Alam, San Jose, CA (US)

( * ) Notice: Subject to any disclaimer, the term of this patent is extended or adjusted under 35 U.S.C. 154(b) by 1 day.

(21) Appl. No.: 13/495,686

(22) Filed: Jun. 13, 2012

(65) Prior Publication Data

US 2013/0215834 A1    Aug. 22, 2013

Related U.S. Application Data (60) Provisional application No. 61/599,852, filed on Feb. 16, 2012, provisional application No. 61/601,688, filed on Feb. 22, 2012.

(51) Int. Cl.
*H04L 12/28* (2006.01)

(52) U.S. Cl.
USPC .......................... 370/254; 370/328; 370/503

(58) Field of Classification Search
None
See application file for complete search history.

(56) References Cited

U.S. PATENT DOCUMENTS

| | | | |
|---|---|---|---|
| 6,477,382 B1 * | 11/2002 | Mansfield et al. | 455/458 |
| 7,184,459 B2 * | 2/2007 | Tiedemann et al. | 375/133 |
| 8,085,716 B2 | 12/2011 | Brunel et al. | |
| 2004/0071119 A1 * | 4/2004 | Ishikawa et al. | 370/335 |
| 2006/0246883 A1 * | 11/2006 | Putcha | 455/419 |
| 2007/0226502 A1 * | 9/2007 | Tenny | 713/170 |
| 2008/0019279 A1 * | 1/2008 | Kim et al. | 370/241 |
| 2009/0111458 A1 * | 4/2009 | Fox et al. | 455/422.1 |
| 2009/0253385 A1 | 10/2009 | Dent et al. | |
| 2010/0135220 A1 | 6/2010 | Bergstrom et al. | |
| 2010/0322098 A1 | 12/2010 | Pelletier et al. | |
| 2011/0149787 A1 | 6/2011 | Digirolamo et al. | |
| 2011/0244823 A1 * | 10/2011 | Chen | 455/404.1 |
| 2011/0287760 A1 * | 11/2011 | Noma | 455/422.1 |
| 2011/0292824 A1 * | 12/2011 | Uemura et al. | 370/252 |
| 2012/0052814 A1 | 3/2012 | Gerber et al. | |
| 2012/0208527 A1 * | 8/2012 | Park | 455/423 |

FOREIGN PATENT DOCUMENTS

| | | |
|---|---|---|
| EP | 2153684 B1 | 2/2012 |
| EP | 2418912 A1 | 2/2012 |
| WO | 2010033957 | 3/2010 |

OTHER PUBLICATIONS

International Search Report and Written Opinion from PCT Application No. PCT/US2013/023780, dated May 15, 2013.

* cited by examiner

*Primary Examiner* — Gregory Sefcheck
*Assistant Examiner* — Daniel Mitchell
(74) *Attorney, Agent, or Firm* — Womble Carlyle Sandridge & Rice LLP (57) ABSTRACT

A method is disclosed for determining an operational state mismatch condition between a user equipment (UE) and a network (NW) in a $3^{rd}$ generation partnership project long term evolution (3GPP LTE) network. In one embodiment, the UE can monitor messages from the NW. If the messages are not consistent with a current UE operational state, then a state mismatch is determined. In another embodiment, the UE can monitor a paging channel. If the UE receives a paging message that is not consistent with a current UE operational state, then a state mismatch is determined.

19 Claims, 9 Drawing Sheets

Detecting state mis-match

Detecting state mis-match

OPERATIONAL STATE MISMATCH IDENTIFICATION FOR A MOBILE DEVICE

CROSS-REFERENCE TO RELATED APPLICATIONS

This application claims the benefit of U.S. Provisional Application No. 61/599,852, filed Feb. 16, 2012, entitled "METHOD FOR OUT OF SYNC IDENTIFICATION," and U.S. Provisional Application No. 61/601,688, filed Feb. 22, 2012, entitled "METHOD FOR OUT OF SYNC IDENTIFICATION," both of which are incorporated by reference herein in their entirety for all purposes.

FIELD OF THE DESCRIBED EMBODIMENTS

The described embodiments relate generally to wireless communications and more particularly to determining the synchronization of operating states between at least two wireless communication units.

BACKGROUND

Wireless communications enable the transfer of data between two or more end points or communication units. In some cases the communication units are mobile devices, base stations, wireless access points, cell phones, smart phones, computers or other similar devices. Communication between two devices is typically governed by a protocol. Some examples of wireless protocols include IEEE 802.11, the Bluetooth Special Interest Group protocol, Zigbee™, WiMax, CDMA 2000™, Long Term Evolution (LTE) set forth by 3$^{rd}$ Generation Partnership Project (3GPP) and others.

Protocols oftentimes define states to describe a mode of operation of a communication unit. For example, the LTE protocol defines at least two communication units, a user equipment (UE) that can be a cell phone and a network (NW) that can be reached through a base station (often referred to as an enhanced node B or eNodeB). The protocol goes on to name at least two states for the UE: 1) radio resource control (RRC) connected and 2) RRC idle. In the RRC idle state, the UE has not established a communication channel with the NW; the UE is not actively transferring data with the NW. In contrast, in the RRC connected state a communication channel has been established between the UE and the NW and data can be transferred between the UE and the NW.

Since data can only be transferred when the UE is in the RRC connected state, the NW oftentimes tracks the state of the UE to ensure that the UE can receive messages and data. If the NW loses track of the operating state of the UE, data transfer can be stalled or the UE can become unresponsive detracting from the user experience.

Therefore, what is desired is a reliable way to track the operational mode of the UE and avoid operating conditions that can adversely affect the overall user experience.

SUMMARY OF THE DESCRIBED EMBODIMENTS

This specification describes various embodiments that relate to a wireless communication device operating in conjunction with wireless network and methods for detecting out of synchronization operating conditions.

In one embodiment, a method for recovering from an out of sync condition between user equipment (UE) and a long term evolution network (NW) can include the steps of determining a first operational state of the UE, determining an operational state mismatch when the state of the UE does not match a state of the NW, sending a control message from the UE to the NW to release network resources assigned to the UE and transitioning to a second state at the UE. In one embodiment, a state mismatch condition can exist when the UE does not receive any grant response messages within a predetermined time period.

In another embodiment, a method for recovering from an out of sync condition between user equipment (UE) and a long term evolution network (NW) can include the steps of determining a first operational state of the UE device, determining an operational state mismatch between the UE and the NW, sending a radio link failure message to the NW and transitioning to a second state at the UE. In one embodiment, a state mismatch condition can exist when a page message is received by the UE while the UE is in the first operational state.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

Network communications protocols enable data exchange between two or more devices distributed within a network. If the network is a wireless network, certain accommodations can be designed into the communication protocol to support noisy communication channels. In some communication protocols, such as the Long Term Evolution (LTE) protocol set forth in the LTE specification from the 3$^{rd}$ Generation Partnership Project (3GPP), can include state definitions for user equipment (UE). The states help define actions and behaviors between the UE and a network (NW). According to the LTE specification, the UE can be in an idle (RRC idle) or a connected (RRC connected) state.

Data can be transferred between the UE and NW, when the UE is in the RRC connected state. The NW often tracks the state of the UE to ensure that the UE can receive transmitted data. One way for the NW to track the state of the UE is to have a corresponding state represented in the NW. Therefore, when both the UE and the NW show the RRC connected state, the NW can transfer data. If the operational state of the UE goes out of sync with the representative state in the NW, then data transfer is stalled and the UE can become unresponsive.

If the UE or the NW can determine when a state mismatch exists (i.e., when the state of the UE does not match the equivalent state of the NW), then steps can be taken to bring the states back to alignment. In one embodiment, the UE can monitor messages sent by the NW when the UE is in the RRC connected state. Certain messages can indicate a state mismatch condition. In one embodiment, a state mismatch condition can be corrected by sending a special message indicating the existence of a state mismatch condition. In another embodiment, a state mismatch condition can be corrected by declaring a radio link failure. Declaring a radio link failure can cause some network devices to reset and start from a well defined state.

Figure 1:
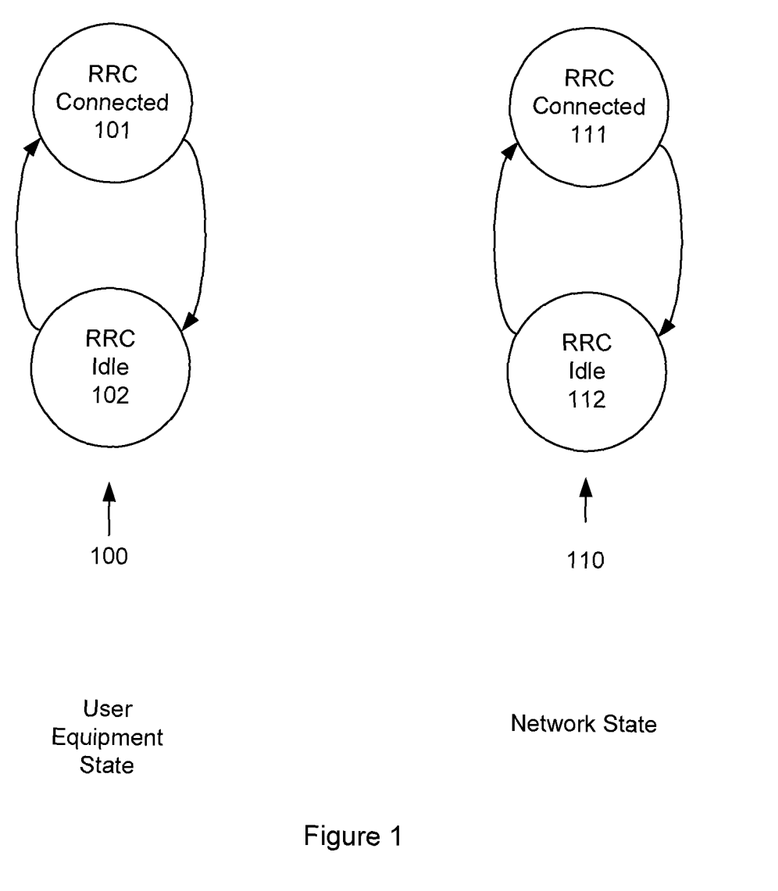
FIG. 1 is a state diagram showing possible operational states in user equipment (UE) and network (NW) devices within the context of a long term evolution (LTE) protocol.

FIG. 1 is a state diagram showing possible operational states in UE and NW devices within the context of a LTE protocol, such as one set forth in the LTE specification from the 3$^{rd}$ Generation Partnership Project (3GPP). The LTE protocol can allow multiple UE devices to operate within shared and limited radio resources. One way to control radio resources, such as time slots and radio frequencies, is by controlling the allocation of network and radio resources to a UE. Unless a UE is actively transferring data to and from the NW, the UE need not be assigned network and radio resources.

A UE can have states 100. A first state is radio resource control idle (RRC idle) 102. In RRC idle 102, data is not transferred between UE and the NW. A second state is RRC connected 101. In RRC connected 101 state, the UE has successfully negotiated with the NW for network and radio resources. Data can be transferred between the UE and NW in RRC connected 101 state.

The NW can have matching states 110. The NW expects the UE to be in either RRC connected 101 or RRC idle 102 states. More particularly, the NW expects the UE to be in a particular state, within the context of UE and NW operations. For example, if the UE has been assigned network and radio resources by the NW, then the NW expects the UE to be in RRC connected state 101. To track the UE RRC connected 101 state, the NW can have a matching state, RRC connected 111. In other words, RRC connected 111 can be the state that matches the UE state RRC connected 101. Similarly, RRC idle 112 can be the state in the NW that matches RRC idle 102 state in the UE.

The LTE communication protocol used by the UE and NW can rely on the NW expecting the UE to be in a specific state. For example, data can only be transferred between the UE and the NW when the UE is in RRC connected 101 state. If the UE is in RRC idle 102 state but the NW understands the UE to be in RRC connected 101 state (i.e., NW is in RRC connected 111 state), the NW can try to transfer data to the UE, but the data will not be correctly received. When the operational state of the UE 100 does not match the corresponding state in the NW 110, a state mismatch exists.

Figure 2:
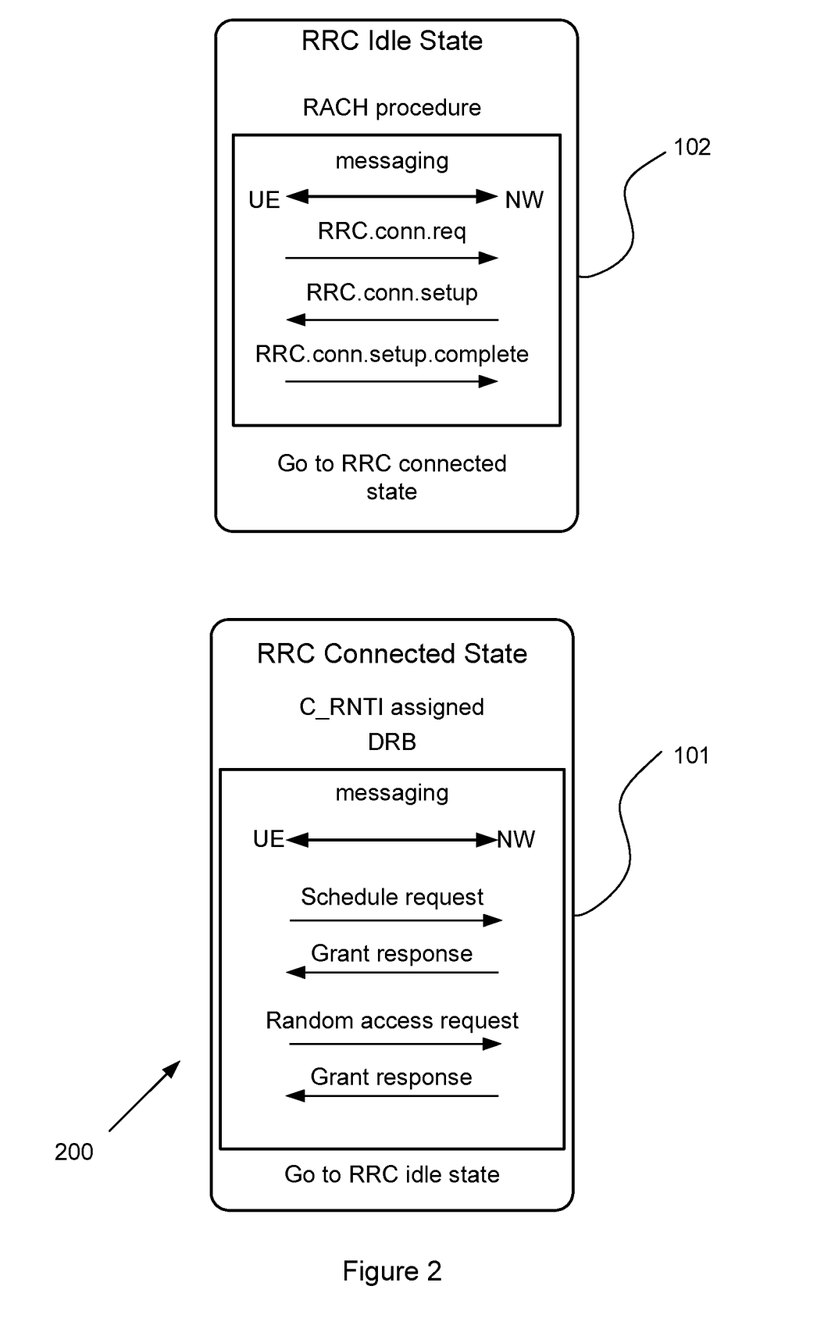
FIG. 2 is a block diagram illustrating some communications and messaging that can be state specific.

FIG. 2 is a block diagram 200 illustrating some communications and messaging that can be state specific. When a UE is in RRC idle 102 state, the UE can hold off on communications with the NW until the UE is in RRC connected 101 state. For the UE to transition to RRC connected 101 state, the UE can transmit on a random access channel (RACH) to the NW. This is one step in what is commonly referred to as a RACH procedure. In one embodiment, the RACH procedure can be executed by the UE to begin the negotiation for network and radio resources from the NW. The UE can continue the negotiation with a connection request (RRC.conn.req) to the NW. The NW can respond with connection setup parameters (RRC.conn.setup) to the UE. When the UE has received the setup parameters and is ready to move to the connected state, the UE can send the NW a message indicating that setup is complete (RRC.conn.setup.complete). The UE can transition to the RRC connected state 101.

In RRC connected 101 state, the NW can assign the UE a cell-radio network temporary identifier (C-RNTI). The C-RNTI can act as a unique, but temporary, identifier for the UE while in the RRC connected 101 state. The C-RNTI can be used to identify unique messages for the UE from the NW. A next step can be the establishment of data radio bearers (DRB). A DRB is a channel configured to transfer data (Internet Protocol packets, more particularly) between the UE and the NW. After the establishment of the DRB, a schedule request can be sent from the UE to the NW. A schedule request can request channel resources from the NW to transfer data. The NW can respond with a grant response that signals the grant of the resource request. Also the UE can present a random access request (RACH) to the NW. The NW can respond with a grant response to grant the RACH request. The UE can remain in the RRC connected 101 state until transfers are complete at which point the UE can transition to RRC idle 102.

As described above, when the UE is in RRC connected 101 state, network and radio resources are allocated to the UE. However, since such resources can be scarce, there are mechanisms to transition the UE from RRC connected 101 to RRC idle 102 if the NW determines that the UE is inactive, moved away from the NW or is otherwise unresponsive. For example, if the NW sees no activity from the UE for a predetermined time period, then the NW can conclude that the UE no longer requires the NW connectivity or the NW resources. In this scenario, the NW can send RRC.conn.release message to the UE. The UE can acknowledge the release command by sending an RRC.conn.release.complete message to the NW. The UE can return to the RRC idle 102 state.

A problem arises when the operational state of the UE (100, FIG. 1) does not match the corresponding state (110, FIG. 1) in the NW. As described above, such state mismatches can cause data transfer errors or cause the UE to become unresponsive. For example, the UE can be in RRC connected 101 state, but may have to tune away from the frequency to survey other radio networks. During that period, if the NW sends a directed message to the UE, then the message may be missed causing the UE to not send an acknowledgement to the NW. In some instances, the NW may consider the UE to have moved away or otherwise become inactive and move the corresponding state to RRC idle 112. When the UE tunes back to the frequency, the NW may not respond to the UE since the NW believes the UE to be idle. No data can be transferred, and in fact, the UE may become unresponsive until the state mismatch is identified and resolved.

Several minutes may elapse before the state mismatch is resolved and normal communications reestablished. For example, the LTE protocol can allow the UE to declare a radio link failure. When a radio link failure is declared, the UE enters RRC idle 102 and restarts the process to establish a connection to the NW and transition to RRC connected 101. That is, a RACH procedure can be executed and messages can be exchanged enabling a connection to be reestablished between the UE and the NW as described previously in FIG. 2 (RRC idle 102). This delay of several minutes can appear as a non-responsive UE to a user and diminish the user's experience.

Figure 3:
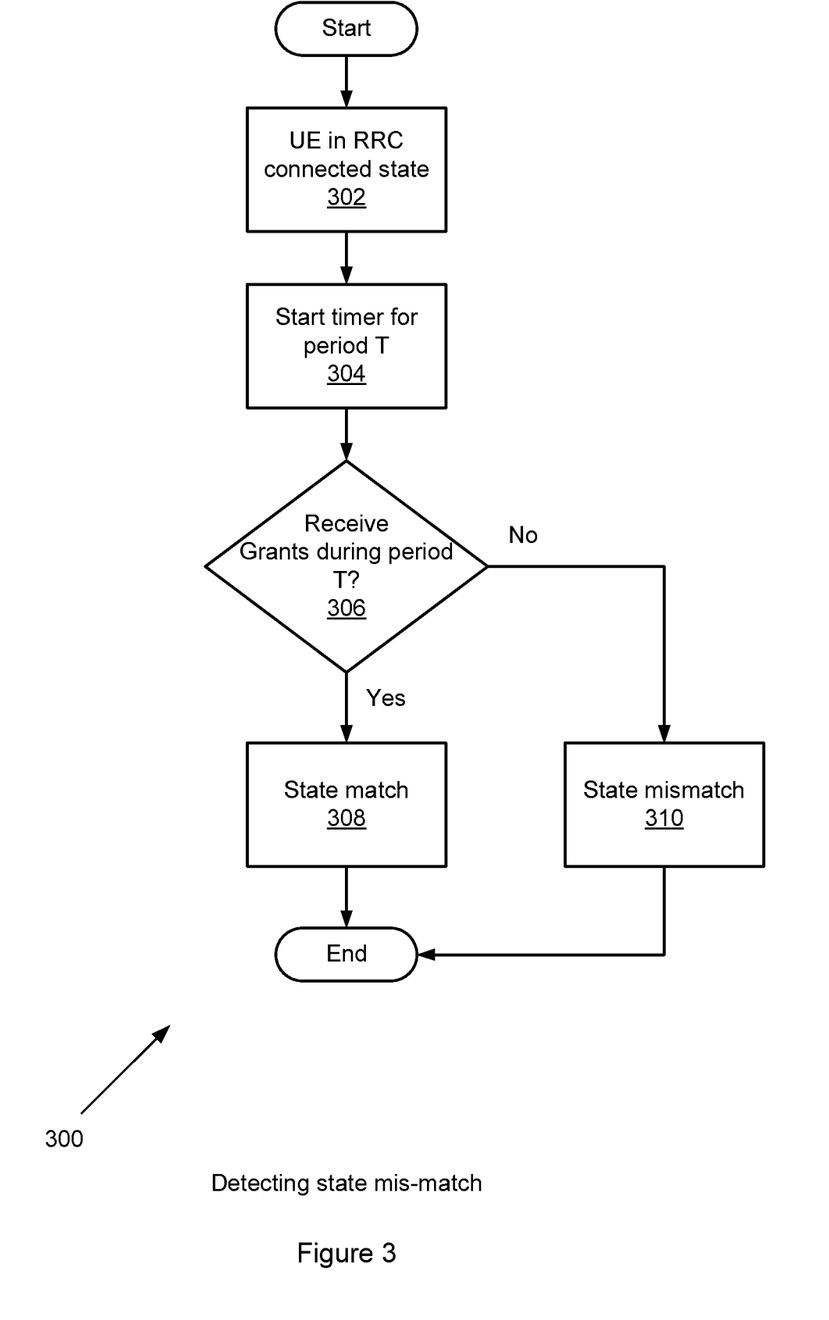
FIG. 3 is a flow chart of method steps for allowing early detection of state mismatches between UE and NW.

FIG. 3 is a flow chart of method steps 300 for allowing early detection of state mismatches between UE and NW. The method begins in step 302 with the UE in RRC connected 101 state. In step 304, the UE starts a timer to determine a period T. During period T, the UE can receive grants from the NW. As described above in conjunction with FIG. 2, in RRC connected state 101, grants can be received in response to the UE sending scheduling requests to the NW. Since the UE is in RRC connected 101 state, the UE can send scheduling requests to transfer data with the NW. Thus, the UE should receive at least one grant in response to scheduling requests during period T. In another embodiment, the UE can receive a grant response from the NW in response to a connected mode RACH message. RACH as described above in conjunction with FIG. 2 can occur prior to a connection is established. As described here, a RACH can also be performed while the UE is in a connected state. In one embodiment, period T can correspond to a connection release timer in the LTE protocol. In step 306, if the UE does not receive at least one grant during period T, then in step 310 the UE can determine that the UE state RRC connected 101 does not match NW state RRC connected 111 and the UE can determine a state mismatch and the method ends. On the other hand, if in step 306 the UE receives at least one grant during period T, then the state RRC connected 101 matches state RRC connected 111 and the method ends.

In the LTE protocol, if the NW has data for the UE, and the UE is in RRC idle 102 state, the NW can page the UE on a paging channel. In response to the page, the UE can request network and radio resources from the NW as described in FIG. 2. After receiving the network and radio resources, the UE can transition to RRC connected 101 state and receives data from the NW. Typically pages are only sent to the UE when the UE is in RRC idle 102 state for incoming data using an idle mode identifier. One exception for receiving pages in a connected state is for system information block (SIB) notification. If the UE is in RRC connected 101 state and the UE receives a page, then the NW is in RRC idle 112 state and there exists a state mismatch between the UE and the NW.

Figure 4:
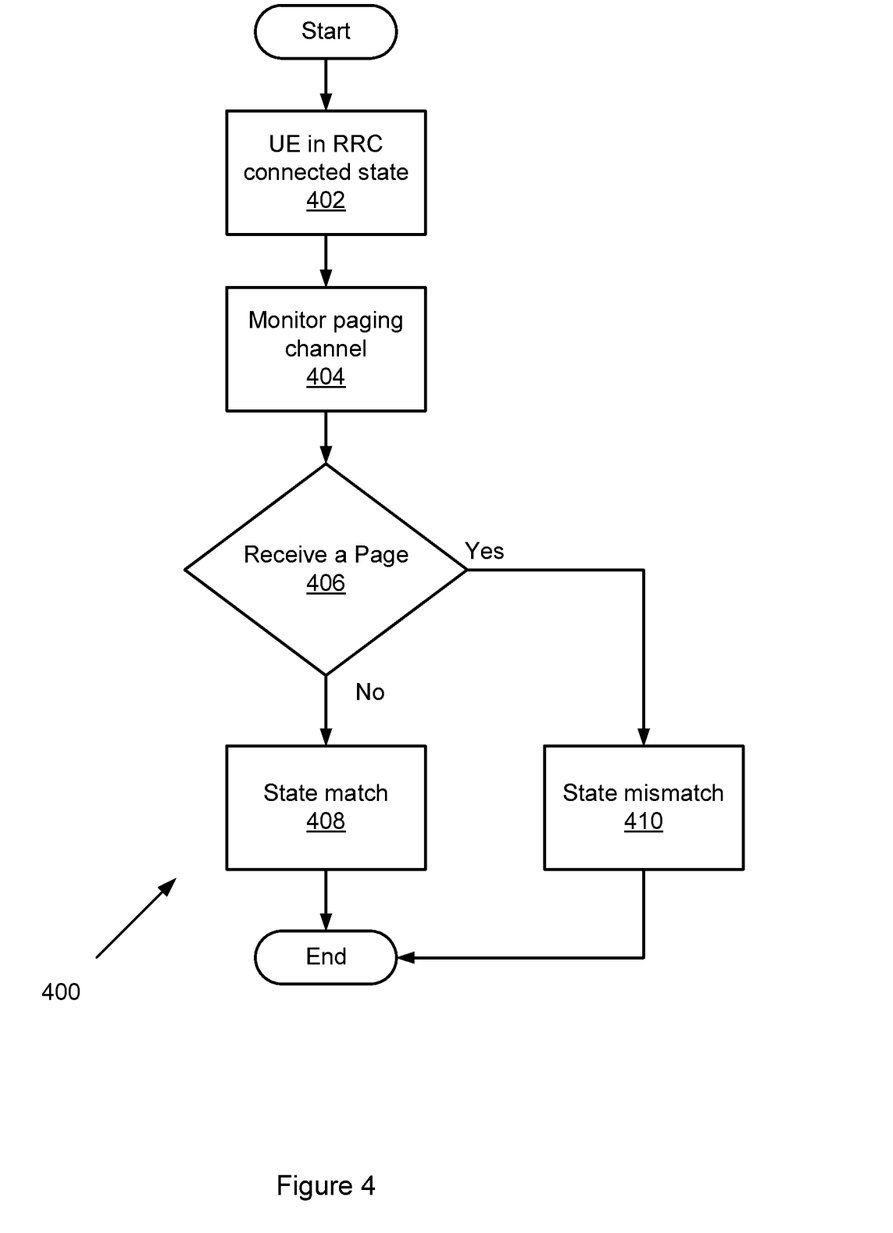
FIG. 4 is another flow chart of method steps for early detection of state mismatches between UE and NW.

FIG. 4 is another flow chart of method steps 400 for early detection of state mismatches between UE and NW. The method begins in step 402 with the UE in RRC connected 101 state. In step 404, the UE can monitor the paging channel. Since the UE is in RRC connected 101 state, the UE should receive no pages. If in step 406 and the UE receives a page, then in step 410 the UE can determine that the UE state RRC connected 101 does not match NW RRC idle 122 state and the method ends. On the other hand, if in step 406 and the UE does not receive a page, then in step 408 then the state RRC connected 101 matches state RRC connected 111 and the method ends. In another embodiment, in step 406 the UE can wait for more than one page to be received before proceeding to step 410 and declaring a state mismatch. In yet another embodiment, the number of pages that the UE can receive before declaring a state mismatch can be a predefined amount, or can be adjusted up or down corresponding to channel conditions.

In the LTE protocol, the NW can instruct the UE to release an established connection by sending an RRC conn.release message to the UE. The UE can respond with a RRC conn.release.complete message to acknowledge the command and release the connection. The UE then transitions to RRC idle 102 state. As described above, the NW can initiate a connection release. If, however, the UE determines a state mismatch, then the UE should initiate a connection release.

Figure 5:
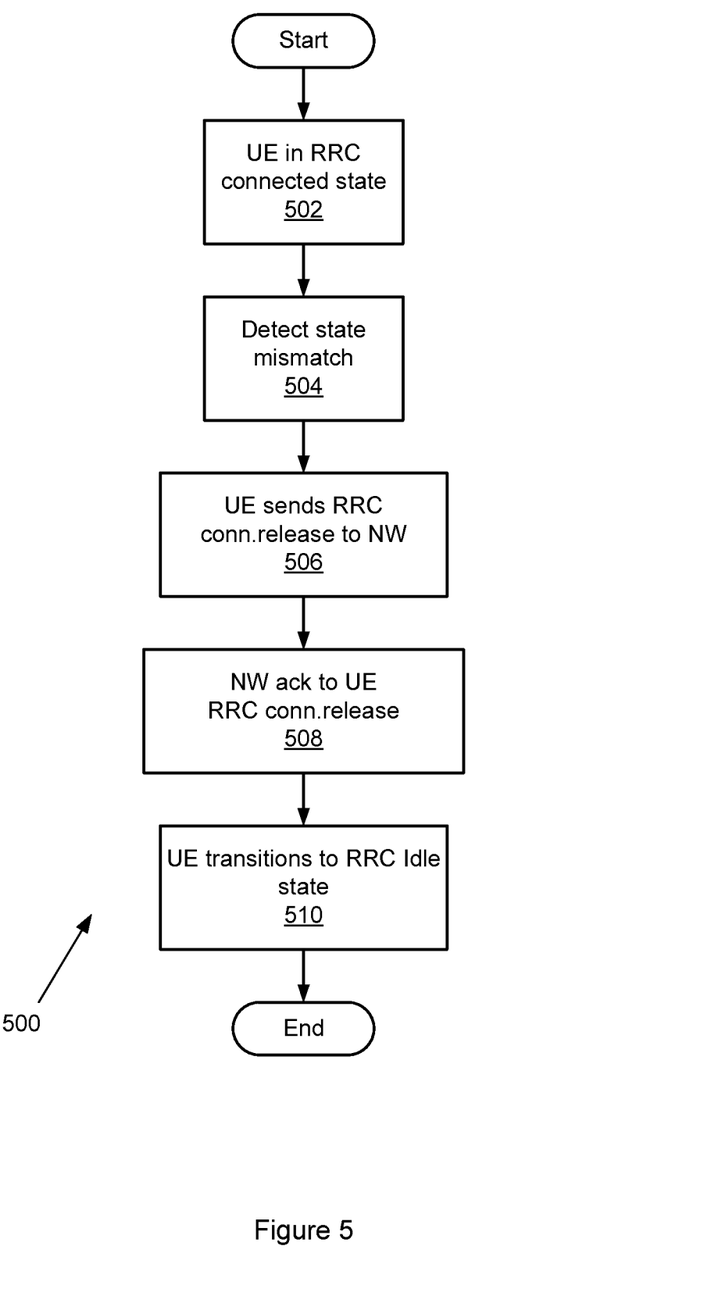
FIG. 5 is a flow chart of method steps for informing the NW of a state mismatch condition.

FIG. 5 is a flow chart of method steps 500 for informing the NW of a state mismatch condition. The method begins in step 502 with the UE in RRC connected 101 state. In step 504 a state mismatch is detected. The state mismatch can be determined as described in conjunction with FIG. 3, FIG. 4 or any other technically feasible way. In step 506, the UE sends an RRC conn.release message to the NW. This message informs the NW that the UE wants to release the connection. In one embodiment, an additional informational element can be added to the RRC conn.release message to indicate one or more details regarding the mismatch condition and further informing the NW if a new connection should be established. In step 508 the NW sends an acknowledge for the RRC conn.release message to the UE. In one embodiment, the NW can send a RRC conn.release.ack message. In another embodiment, the NW can send a RRC conn.release to the UE as described above to instruct the UE to release the connection. In step 510, the UE can transition to RRC idle 102 state. In one embodiment, one or more of the RRC messages described herein may not be set forth in the LTE specification.

As described above, if the UE loses contact or coordination with the NW, the UE can declare a radio link failure. Unfortunately, within the current scope of the LTE specification, a radio link failure is only declared after several message failures. Oftentimes, a number of message failures can accumulate so that several minutes elapse before a radio link failure is declared. During this period no data is transferred and the user experience is negatively affected.

Figure 6:
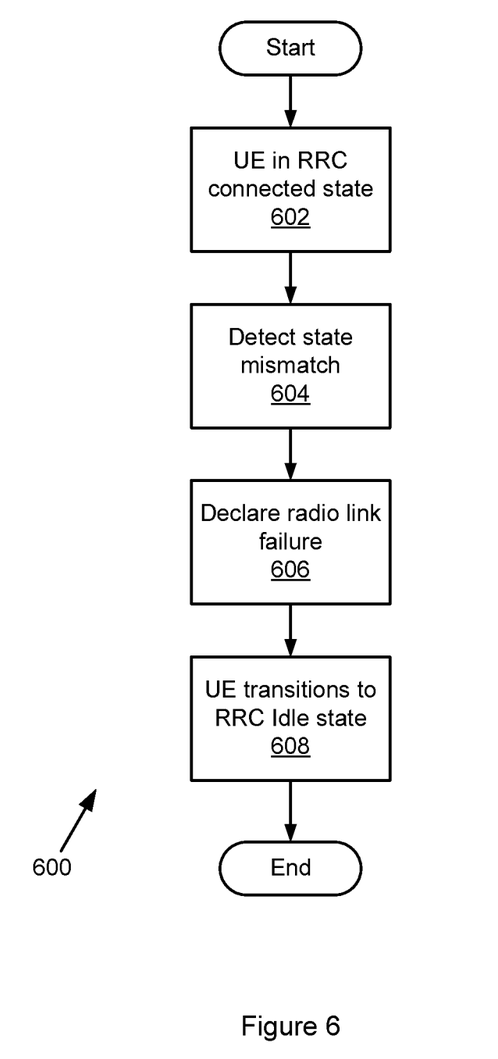
FIG. 6 is flow chart of method steps for recovering from a state mismatch condition.

FIG. 6 is flow chart of method steps 600 for recovering from a state mismatch condition. The method begins in step 602 with the UE in RRC connected 101 state. In step 604 a state mismatch is detected. As described above, the state mismatch can be determined as described in conjunction with FIG. 3, FIG. 4 or any other technically feasible method. In step 606, the UE can declare a radio link failure to the NW. In step 608, the UE can transition to the RRC idle 102 state and the method ends. Declaring a radio link failure in step 606 can shorten recovery time by circumventing the period required for sending (and failing to receive) messages and acknowledgments between the NW and UE.

RRC messages sent between the NW and the UE are an important part of the LTE mechanism for maintaining a state synchronization. Within the LTE specification, there are safeguards and redundancies built in to accommodate noisy communication channels. For example, in a relatively good communication channel, a message can be sent from A to B and an acknowledgement message sent response from B to A. If the communication channel is relatively noisy, then a number of retries may be required before a message from A to B is successfully sent. Furthermore, the acknowledge message from B to A may require several attempts as well.

The LTE specification sets forth a permissible number of attempts for sending a message and also a permissible number of attempts for acknowledging the receipt of a message. The number of attempts set forth, however, may be too restrictive in some cases and may cause mismatches in states between UE and NW. A state mismatch can occur if, for example, after missing a RRC message, the UE declares a radio link failure. In some cases, adaptively adjusting message retry attempts can reduce state mismatches.

Figure 7:
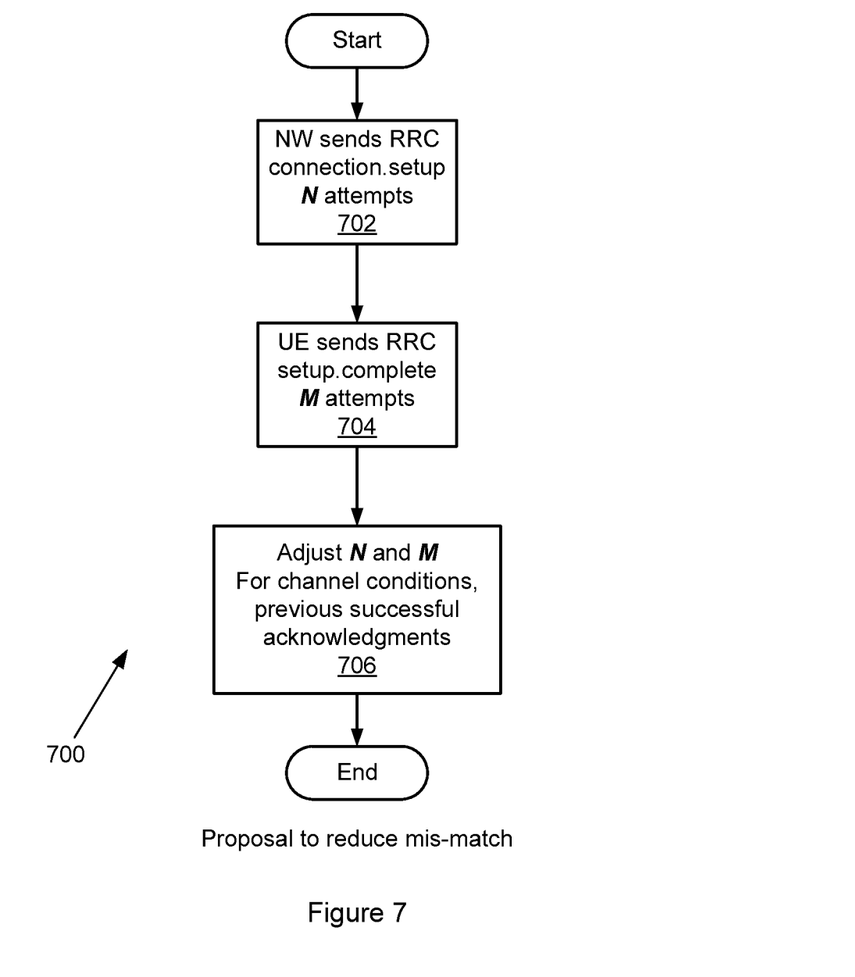
FIG. 7 is a flow chart of method steps for reducing state mismatches.

FIG. 7 is a flow chart of method steps 700 for reducing state mismatches. By way of example, and not limitation, the method is described in the context of a RRC connection.setup message and a related acknowledgement RRC setup.complete message. The method can be applied to any message and corresponding acknowledgement, both singly or in pairs.

The method begins in step 702 when the NW sends RRC connection.setup message to UE with at least N attempts. In step 704, the UE responds by sending a RRC setup.complete message in response with at least M attempts. In step 706 the UE and NW can adjust N and M in response to channel conditions, previous successful acknowledgements and the like. If, for example, the channel is particularly noisy, then M and N can be adjusted upward. Alternatively, if the channel is particularly quiet, the M and N can be adjusted downward.

Another approach to reducing state mismatches addresses activity timeout detection by the NW. As described above, the NW can assume the UE to be inactive if the UE does not respond to messages sent by the NW. The NW can have a timer configured to determine a timeout period. If no responses are received by the NW within the timeout period, the NW can assume the UE is inactive and transition to RRC idle 112 state. For example, if the UE tunes away for a period of time that exceeds an activity timeout period, the NW can assume the UE is inactive. This erroneous inactivity determination can be addressed by increasing the activity timeout period of the NW. Increasing the timeout period allows the UE more time to tune away and return to the NW to acknowledge messages and can reduce the number of times the NW incorrectly transitions into RRC idle 112.

Figure 8:
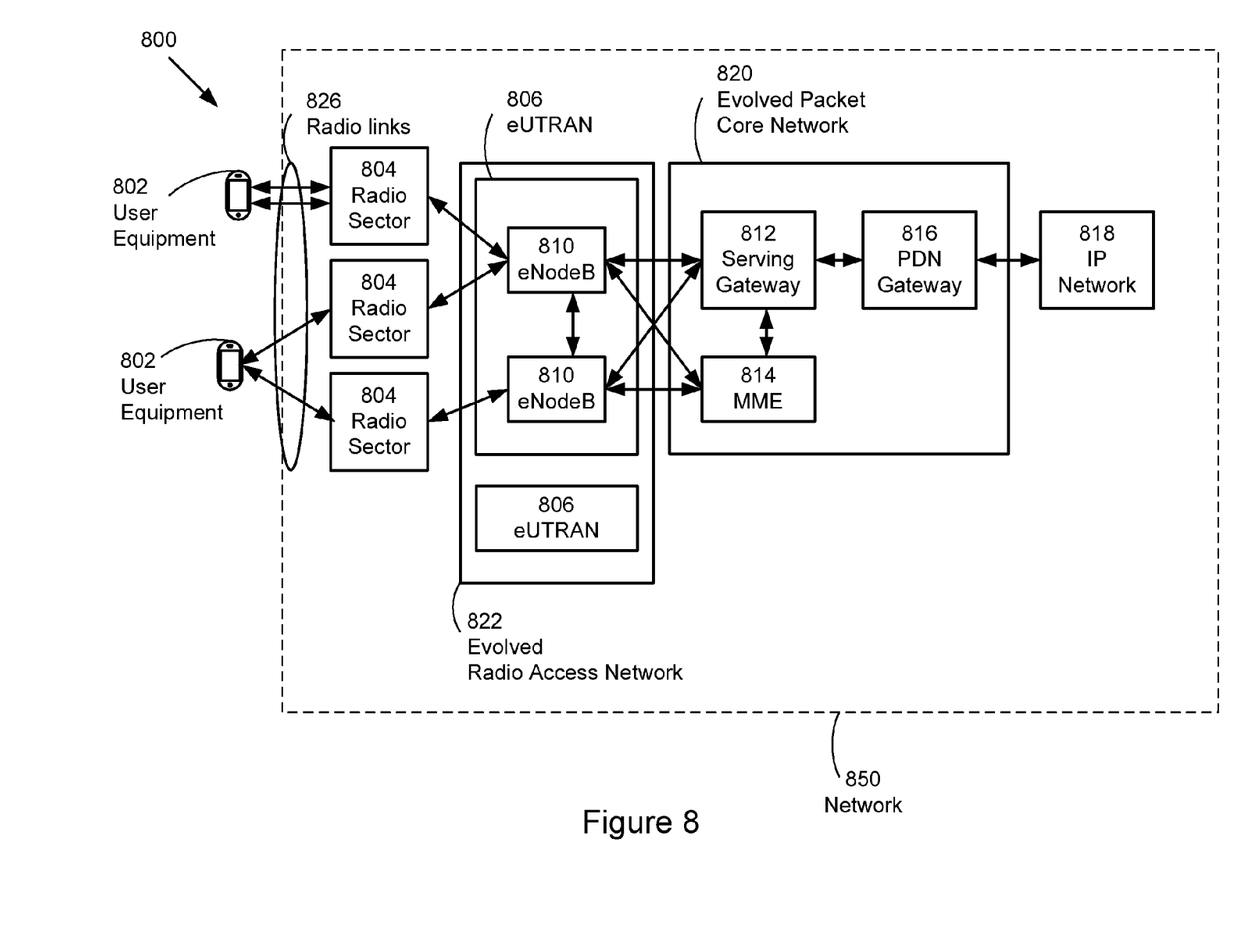
FIG. 8 illustrates a representative LTE wireless network architecture designed as a packet switched network exclusively.

FIG. 8 illustrates a representative LTE network 800 architecture designed as a packet switched network exclusively. User equipment 802 can connect to an evolved radio access network 822 through radio links 826 associated with radio sectors 804 that emanate from evolved Node B's (eNodeB) 810. The eNodeB 810 includes the functions of both the transmitting and receiving base stations as well as the base station radio controllers. The equivalent core network of the LTE wireless network 800 is an evolved packet core network 820 including serving gateways 812 that interconnect the evolved radio access network 822 to public data network (PDN) gateways 816 that connect to external internet protocol (IP) networks 818. Multiple eNodeB 810 can be grouped together to form an evolved UTRAN (eUTRAN) 806. The eNodeB 810 can also be connected to a mobility management entity (MME) 814 that can provide control over connections for the user equipment 802. With respect to the descriptions in FIGS. 1 through 7 above, LTE NW can correspond to one or more elements within network 850 acting separately or as a whole, as shown by the dashed line in FIG. 8.

Figure 9:
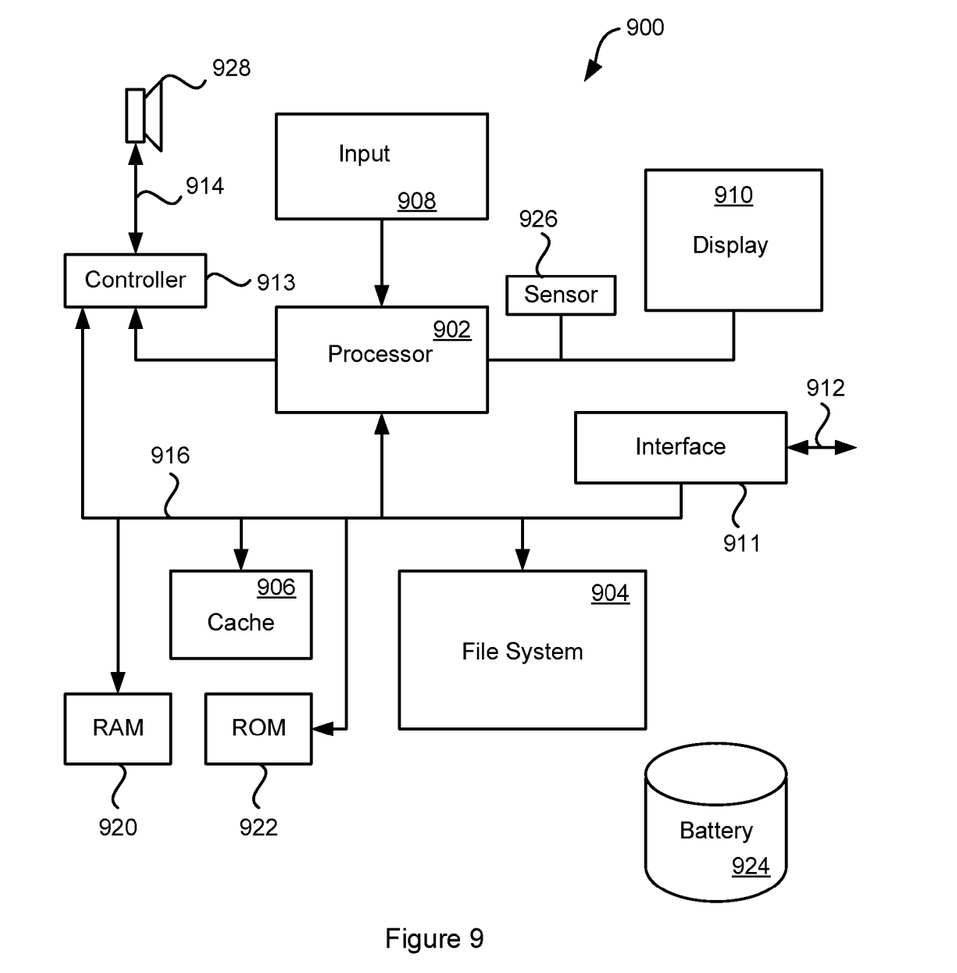
FIG. 9 is a block diagram of an electronic device suitable for controlling some of the processes in the described embodiment.

FIG. 9 is a block diagram of an electronic device suitable for controlling some of the processes in the described embodiment. Electronic device 900 can illustrate circuitry of a representative computing device. Electronic device 900 can include a processor 902 that pertains to a microprocessor or controller for controlling the overall operation of electronic device 900. Electronic device 900 can include instruction data pertaining to operating instructions, such as instructions for implementing controlling a UE, in a file system 904 and a cache 906. File system 904 can be a storage disk or a plurality of disks. In some embodiments, file system 904 can be flash memory, semiconductor (solid state) memory or the like. The file system 904 can typically provide high capacity storage capability for the electronic device 900. However, since the access time for the file system 904 can be relatively slow (especially if file system 904 includes a mechanical disk drive), the electronic device 900 can also include cache 906. The cache 906 can include, for example, Random-Access Memory (RAM) provided by semiconductor memory. The relative access time to the cache 906 can be substantially shorter than for the file system 904. However, cache 906 may not have the large storage capacity of file system 904. Further, file system 904, when active, can consume more power than cache 906. Power consumption often can be a concern when the electronic device 900 is a portable device that is powered by battery 924. The electronic device 900 can also include a RAM 920 and a Read-Only Memory (ROM) 922. The ROM 922 can store programs, utilities or processes to be executed in a non-volatile manner. The RAM 920 can provide volatile data storage, such as for cache 906

Electronic device 900 can also include user input device 908 that allows a user of the electronic device 900 to interact with the electronic device 900. For example, user input device 908 can take a variety of forms, such as a button, keypad, dial, touch screen, audio input interface, visual/image capture input interface, input in the form of sensor data, etc. Still further, electronic device 900 can include a display 910 (screen display) that can be controlled by processor 902 to display information, such as web pages, to the user. Data bus 916 can facilitate data transfer between at least file system 904, cache 906, processor 902, and input/output (I/O) controller 913. I/O controller 913 can be used to interface with and control different devices such as speakers, ear buds, microphone or video cameras through appropriate codecs. For example, control bus 914 can be used to control speaker 928.

Electronic device 900 can also include a network/bus interface 911 that couples to data link 912. Data link 912 can allow electronic device 900 to couple to a host computer or to accessory devices or to other networks such as the internet. The data link 912 can be provided over a wired connection or a wireless connection. In the case of a wireless connection, network/bus interface 911 can include a wireless transceiver, such as a wireless transceiver configured to transmit and receive data according to the LTE protocol. Sensor 926 can take the form of circuitry for detecting any number of stimuli. For example, sensor 926 can include any number of sensors for monitoring a environmental conditions such as for example a Hall Effect sensor responsive to external magnetic field, an audio sensor, a light sensor such as a photometer, computer vision sensor to detect clarity, a temperature sensor and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for recovering from a radio resource control (RRC) operational state mismatch between a user equipment (UE) device and one or more network elements of a network (NW) operating in accordance with a Long Term Evolution (LTE) protocol, the method comprising the UE device:
   determining a first RRC operational state of the UE device, wherein the first RRC operational state of the UE device includes an RRC idle state or an RRC connected state;
   determining the RRC operational state mismatch when the first RRC operational state of the UE device does not match a first RRC operational state for the UE device maintained at the one or more network elements of the NW, wherein the first RRC operational state for the UE device maintained at the one or more network elements of the NW includes an RRC idle state or an RRC connected state;
   sending at least one RRC message from the UE device to the NW to release NW resources assigned to the UE device, in response to determining the RRC operational state mismatch; and
   transitioning the UE device from the first RRC operational state of the UE device directly to a second RRC operational state of the UE device after sending the at least one RRC message to the NW, wherein the second RRC operational state of the UE device includes an RRC idle state or an RRC connected state, and
   wherein the second RRC operational state of the UE device matches the first RRC operational state for the UE device maintained at the one or more network elements of the NW.

2. The method of claim 1, wherein determining the RRC operational state mismatch further comprises the UE device:
   determining a time period during which to receive grant response messages from the NW in response to schedule request messages sent from the UE device to the NW; and
   determining the RRC operational state mismatch when no grant response messages are received from the NW during the time period.

3. The method of claim 2, wherein the time period during which to receive grant response messages from the NW corresponds to a connection release time period that is associated with the LTE protocol.

4. The method of claim 1, wherein the first RRC operational state of the UE device comprises the RRC connected state and the second RRC operational state of the UE device comprises the RRC idle state.

5. The method of claim 1, wherein the at least one RRC message comprises at least one RRC connection release message.

6. The method of claim 1, wherein determining the RRC operational state mismatch further comprises the UE device, while in the first RRC operational state of the UE device:
   monitoring a paging channel; and
   determining the RRC operational state mismatch when at least one page message from the NW is received,
   wherein the first RRC operational state of the UE device is the RRC connected state and the second RRC operational state of the UE device is the RRC idle state.

7. The method of claim 6, wherein the at least one page message comprises at least a positive integer number N of page messages received from the NW, and the method further comprises the UE device:
   increasing N in response to a worsening of communication channel conditions; and
   decreasing N in response to an improving of communication channel conditions.

8. The method of claim 1, wherein the at least one RRC message comprises at least a positive integer number M of RRC messages, and the method further comprises the UE device:
   increasing M in response to a degradation of communication channel conditions; and
   decreasing M in response to an improvement in communication channel conditions.

9. A non-transitory computer-readable medium storing executable instructions that, when executed by one or more processors of a user equipment (UE) device, causes the UE device to:
   determine a first radio resource control (RRC) operating state of the UE device when the UE Device is operating in a Long Term Evolution (LTE) network (NW), wherein the first RRC operating state of the UE device includes an RRC idle state or an RRC connected state;
   determine an RRC operating state mismatch condition between the UE device and the LTE NW when the first RRC operating state of the UE device and a first RRC operating state for the UE device maintained at the LTE NW do not match, wherein the first RRC operating state for the UE device maintained at the LTE NW includes an RRC idle state or an RRC connected state;
   send at least one RRC message to the LTE NW in response to the determined RRC operating state mismatch condition; and
   transition the UE device from the first RRC operating state of the UE device directly to a second RRC operating state of the UE device that corresponds to the first RRC operating state for the UE device maintained at the LTE NW after sending the at least one RRC message to the LTE NW, wherein the second RRC operating state of the UE device includes an RRC idle state or an RRC connected state.

10. The non-transitory computer-readable medium of claim 9, wherein the UE device determines the RRC operating state mismatch condition by:
   determining a first time period during which to receive grant response messages from the LTE NW; and
   determining that the first RRC operating state of the UE device does not match the first RRC operating state for the UE device maintained at the LTE NW when no grant response messages are received from the LTE NW during the determined first time period.

11. The non-transitory computer-readable medium of claim 9, wherein the UE device determines the RRC operating state mismatch condition by:
monitoring a paging channel; and
determining that the first RRC operating state of the UE device does not match the first RRC operating state for the UE device maintained at the LTE NW when at least one paging message is received on the paging channel.

12. The non-transitory computer-readable medium of claim 11, wherein the at least one paging message comprises at least a positive integer number N of paging messages, and the execution of the executable instructions by the one or more processors, further causes the UE device to:
increase N in response to a degradation of communication channel conditions; and
decrease N in response to an improvement in communication channel conditions.

13. The non-transitory computer-readable medium of claim 9, wherein the UE device sends the at least one RRC message to the LTE NW by sending a RRC connection release message to the LTE NW.

14. The non-transitory computer-readable medium of claim 9, wherein the UE device sends the at least one RRC message to the LTE NW by sending a radio link failure (RLF) message to the LTE NW.

15. The non-transitory computer-readable medium of claim 9, wherein the at least one RRC message comprises at least a positive integer M of messages, and the execution of the executable instructions by the one or more processors, further causes the UE device to:
increase M in response to a degradation of communication channel conditions; and
decrease M in response to an improvement in communication channel conditions.

16. An apparatus for recovering from a radio resource control (RRC) operational state mismatch between a user equipment (UE) device and one or more network elements of a network (NW), the apparatus comprising:
one or more processors;
a memory coupled with the one or more processors and storing executable instructions; and
at least one wireless transceiver coupled with the one or more processors and the memory,
wherein an execution of the executable instructions by the one or more processors, causes the apparatus to:
determine a first RRC operational state of the UE device, wherein the first RRC operational state of the UE device includes an RRC idle state or an RRC connected state;
determine an RRC operational state mismatch when the first RRC operational state of the UE device does not match a first RRC operational state for the UE device maintained at the NW, wherein the first RRC operational state for the UE device maintained at the NW includes an RRC idle state or an RRC connected state;
send at least one RRC message from the UE device to the NW to release NW resources assigned to the UE device, in response to determining the RRC operational state mismatch; and
transition the UE device from the first RRC operational state of the UE device directly to a second RRC operational state of the UE device after sending the at least one RRC message to the NW, wherein the second RRC operational state of the UE device includes an RRC idle state or an RRC connected state, and
wherein the second RRC operational state of the UE device matches the first RRC operational state associated with the UE device of the NW.

17. The apparatus of claim 16, wherein the apparatus determines the RRC operational state mismatch by:
determining a time period to receive grant response messages from the NW in response to schedule request messages sent from the UE device to the NW; and
determining the RRC operational state mismatch when no grant response messages are received from the NW during the time period.

18. The apparatus of claim 16, wherein the apparatus determines the RRC operational state mismatch by:
monitoring a paging channel; and
determining that the first RRC operational state of the UE device does not match the first RRC operational state for the UE device maintained at the NW when at least one paging message is received from the NW on the paging channel.

19. The apparatus of claim 18, wherein the at least one paging message comprises at least a positive integer number N of paging messages, and the execution of the executable instructions by the one or more processors, further causes the apparatus to:
increase N in response to a degradation of communication channel conditions; and
decrease N in response to an improvement in communication channel conditions.

* * * * *

UNITED STATES PATENT AND TRADEMARK OFFICE
CERTIFICATE OF CORRECTION

PATENT NO. : 8,885,517 B2
APPLICATION NO. : 13/495686
DATED : November 11, 2014
INVENTOR(S) : Deivasigamani et al.

It is certified that error appears in the above-identified patent and that said Letters Patent is hereby corrected as shown below:

In the Claims:

Column 10, line 38 (Claim 9, line 6): "UE Device" should read --UE device--.

Signed and Sealed this
Tenth Day of February, 2015

Michelle K. Lee
*Deputy Director of the United States Patent and Trademark Office*